United States Patent [19]

Dessertine et al.

[11] Patent Number: 4,899,839

[45] Date of Patent: Feb. 13, 1990

[54] COMPLIANCE AND PATIENT STATUS MONITORING SYSTEM AND METHOD

[76] Inventors: Albert L. Dessertine, 53 Park Ave.; Thomas P. Hudson, 6 Cider Mill Circle, both of Flemington, N.J. 08822

[21] Appl. No.: 365,933

[22] Filed: Jun. 14, 1989

[51] Int. Cl.[4] .................... G01G 23/18; G01G 19/52; G06F 15/42

[52] U.S. Cl. ................................. 177/25.19; 177/50; 364/413.02

[58] Field of Search .............................. 177/25.19, 50; 364/413.02

[56] References Cited

U.S. PATENT DOCUMENTS

| | | | |
|---|---|---|---|
| 3,863,724 | 2/1975 | Dalia, Jr. ........................... | 177/25.19 |
| 4,318,447 | 3/1982 | Northcutt ......................... | 177/25.19 |
| 4,366,873 | 1/1983 | Levy et al. ........................ | 177/25.19 |
| 4,423,792 | 1/1984 | Cowan .............................. | 177/25.19 |
| 4,576,244 | 3/1986 | Zeigner et al. ............... | 177/25.19 X |
| 4,577,710 | 3/1986 | Ruzumna ...................... | 177/25.19 X |
| 4,629,015 | 12/1986 | Fried et al. ...................... | 177/25.19 |
| 4,837,719 | 6/1989 | McIntosh et al. ......... | 364/413.01 X |
| 4,847,764 | 7/1989 | Halvorson ..................... | 364/413.02 |

Primary Examiner—George H. Miller, Jr.
Attorney, Agent, or Firm—Kenneth P. Glynn

[57] ABSTRACT

The present invention is directed to a method of monitoring a patient's medicine compliance. It involves weighing a container of medicine to determine a starting weight on a scale which is connected to a computer with a display unit and storing the starting weight in the computer followed by reweighing the container of medicine after a prescribed dosage is consumed to determine a second weight. The computer then determines the difference between the starting weight and said second weight to store a dosage unit weight. The computer is programmed to calculate compliance required weights of the container for each dosage administration for the prescription period of the medicine. The container of medicine is reweight from time to time on the scale to compare actual weight with compliance required weight to determine compliance and the computer visually displays the compliance results on the display unit to permit compliance monitoring. Optionally, other patient characteristics are also monitored and feedback is provided. The present invention includes both the method and the system of interconnected devices to practice the method. Feedback may be to the patient for self-monitoring or to a professional, and a single medicine or a plurality of medicines may be monitored.

26 Claims, 2 Drawing Sheets

COMPLIANCE AND PATIENT STATUS MONITORING SYSTEM AND METHOD

BACKGROUND OF THE INVENTION

1. Field of the Invention

The present invention is directed to a method and system for monitoring a patient's compliance with a medicine regmen. It is directed to compliance monitoring by the patient (self-monitoring) and/or by a professional such as a pharmacist, doctor, hospital, clinic or the like. The present invention involves the use of one or more scales and computers for monitoring and optionally includes monitoring of other patient status information such as physical characteristics, e.g. heart rate, blood pressure, etc. and/or treatment program compliance such as physical therapy or exercise regimens.

2. Prior Art Statement

The use of precision weighing scales, unique programming, computers and linking peripherals to monitor medicine regimen compliance has not been taught in the prior art.

U.S. Pat. No. 4,577,710 issued to Edward Ruzumno is directed to an apparatus for promoting good health which involves a personal weight scale and an information and message center which may be used merely for weight control or may be used for specific messages pertaining to a health condition with pretaped feedback from a physician. This recently issued patent represents the concept of patient weight monitoring for general or specific health purposes. However, it does not pertain to medicine regimen compliance, weighing medicine containers or computer linking as in the present invention.

U.S. Pat. No. 4,629,015 issued to Fried et al is also directed to patient weight monitoring and includes a graphic display but is not used for medicine regimen or other patient monitoring.

U.S. Pat. No. 3,863,724 to Dalia, Jr. is not directed to health care but to inventory control of alcohol or other dispensed materials. It involves weight difference reading by scale and computer but is neither directed to medicine regimen nor to patient feedback.

SUMMARY OF THE INVENTION

The present invention is directed to a method of monitoring a patient's medicine compliance. It involves weighing a container of medicine to determine a starting weight on a scale which is connected to a computer with a display unit and storing the starting weight in the computer followed by reweighing the container of medicine after a prescribed dosage is consumed to determine a second weight. The computer then determines the difference between the starting weight and said second weight to store a dosage unit weight. The computer is programmed to calculate compliance required weights of the container for each dosage administration for the prescription period of the medicine. The container of medicine is reweighed from time to time on the scale to compare actual weight with compliance required weight to determine compliance and the computer visually displays the compliance results on the display unit to permit compliance monitoring. Optionally, other patient characteristics are also monitored and feedback is provided. The present invention includes both the method and the system of interconnected devices to practice the method. Feedback may be to the patient for self-monitoring or to a professional, and a single medicine or a plurality of medicines may be monitored.

BRIEF SUMMARY OF THE DRAWINGS

The present invention, its advantages and objects will be more fully understood when the specification herein is taken in conjunction with the appended drawings hereto, wherein.

DETAILED DESCRIPTION OF THE INVENTION

The present invention involves both a method and a system for monitoring a patient's compliance with regard to adhering to a particular medicine regimen. It is directed to compliance monitoring by the patient (self-monitoring), or by a professional such as a pharmacist, a doctor, a physical therapist, a chiropractor or the like or by a hospital or clinic or staff of a convalescent home or any combination of these. Thus, the present invention may involve patient (self-monitoring) as well as contemporaneous professional monitoring. Further, the invention involves using one or more scales and generally one scale and one or more computers which are uniquely interconnected. Further, optional status of patient health characteristics may be monitored in addition to medicine regimen and computer tracking, feedback and other communication may be included. Thus, a patient's heart rate, blood pressure, glucose level, cholesterol level, weight, or other physical characteristics may be monitored or some compliance with a physical therapy program or exercise program may be monitored in addition to the medicine regimen monitoring.

Figure 1:
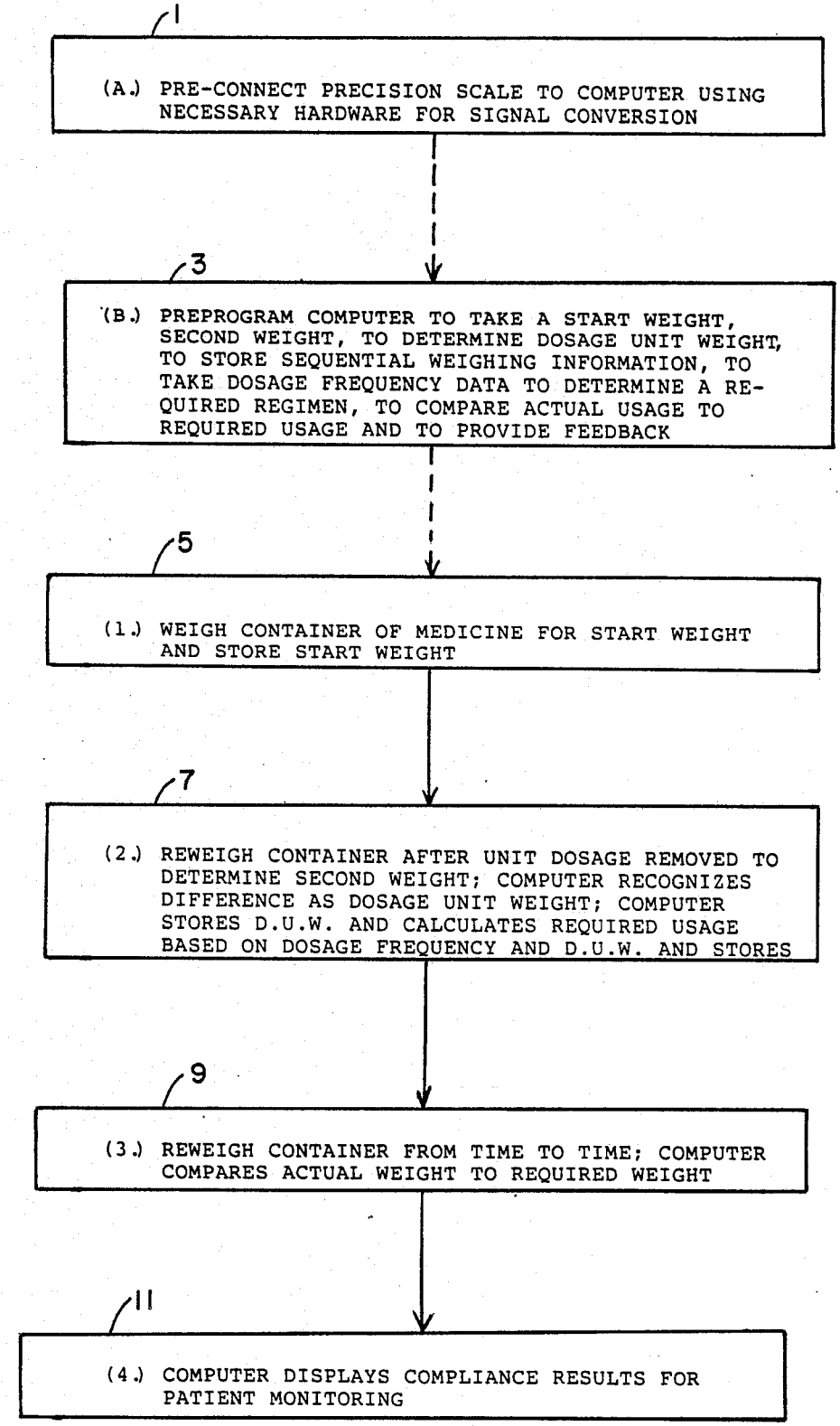
FIG. 1 illustrates a diagramatic representation of some preferred embodiments of the present invention; and, FIG. 2 illustrates a schematic diagram of the present invention showing the interrelationships of the various components.

Referring now to FIG. 1, there is shown a flow diagram with steps (A) and (B) shown which involve preparing the system for using the method of the present invention as well as steps 1 through 4 which show an embodiment involving the steps of the present invention. Thus, frame 1 shows step (A) wherein a scale is preconnected to a computer using the necessary hardware for signal conversion. Thus, a precision scale which is capable of accurate weighings to significant figures such as the weights of dosage units is interconnected with a computer. Thus, for example, the scale may be used to generate a signal which may be amplified and then converted from analog to digital using a state of the art analog digital converter and then the signal would be inputed to the computer. Additionally, as shown in FIG. 1, step (B) involves the preprograming of the computer to take and recognize various information such as a starting weight, and a second weight which is used to determine a dosage unit weight (the difference between the two), to store sequential weighing information to take dosage frequency data so as to determine a required regimen and to compare actual usage against the required usage as well as to provide feedback. Having thus preprogrammed a computer to perform these functions as well as optional functions described below, the system may now be used to practice the method of the present invention.

Referring again to FIG. 1, frame 5 shows the first step 1 wherein a container of medicine is weighed for a starting weight and the starting weight is stored within the computer. Frame 7 shows the second step wherein the container is reweighed after a unit dosage is removed or consumed so as to determine a second weight. The computer then recognizes the difference between the first weight and the second weight as a dosage unit weight. The computer calculates the required usage based on the dosage frequency and on the dosage unit weight and stores this information. Frame 9 shows the third step wherein the container medicine is reweighed from time to time by the user and the computer compares the actual weight to the required weight at that particular time. Frame 11 shows the fourth step wherein the computer displays compliance results for patient monitoring.

As can be seen, the computer used in the present invention may be any conventional computer system and may be interlinked by way of modem or radio transmission or any other computer linking possibilities. Likewise, a sensitive digital or analog scale could be used and the trace of particular equipment would be within the purview of the artisan.

Figure 2:
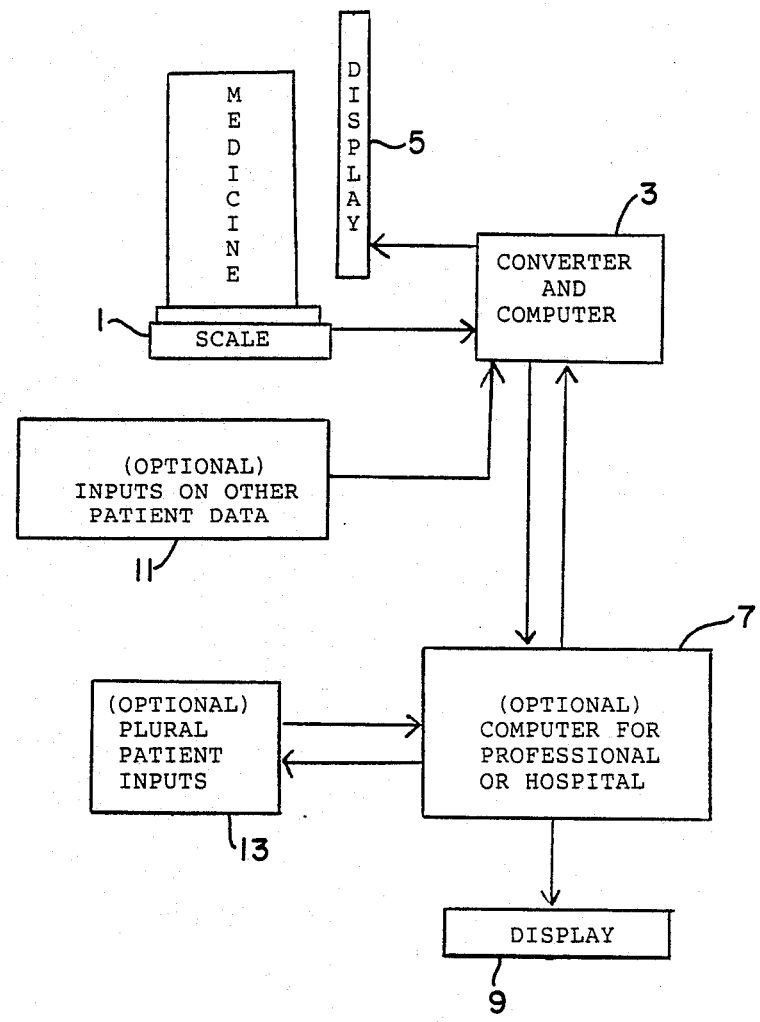

Referring now to FIG. 2, there is shown scale 1 which is connected to converter and computer 3 which is in turn connected to display unit 5. Additionally, converter and computer 3 is connected to an optional computer for professional or hospital use shown as 7 and this is connected to display unit 9. Optionally, inputs on other patient data may be :fed into converter and computer 3 and these optional inputs are shown as block 11. Further, if a professional or hospital is monitoring patient's medicine regimen, then computer 7 and display unit 9 may be interconnected with a plurality of other patient inputs 13 and thus professionals may seqentially or randomly monitor a plurality of patients with the same system. This may be beneficial for convalescent homes, cancer treatment centers, rehabilitation centers and the like where patient progress and medicine regimen may be monitored from a single computer station.

In one preferred embodiment of the present invention, the medicine taker or user of the system is requested to weigh the bottle of medicine or a plurality of bottles of medicine each time the medicine is taken. Thus, in this embodiment, the expression "weighing the medicine from time to time" refers to each time it is used. In this manner, optimum monitoring is achieved so that if there is an overdosage or a missed dosage, the present invention system will alert the user, or a professional or both of the deficiency or overdosage. Additionally, the system may, as mentioned, be used to provide monitoring for more than one medication at a time. This may be done by including an optional scanner whereby the medicine bottle has a code which is read by the scanner and properly identified by the computer before the computer calculates and compares actual and required dosages. Alternatively, the user may punch in or feed into the computer identification for each medicine. Alternatively, other ways of discerning one bottle of medication from another may be included without exceeding the scope of the present invention.

In another preferred embodiment of the present invention, the system is used to also monitor heart rate, blood pressure, glucose, cholesterol, blood cell count, respiration, body weight or other physical characteristic or characteristics and these may be monitored by the patient or by a professional. Alternatively, or in addition to the foregoing, the system may be used to also monitor compliance with a physical regimen such as a physical exercise program or a physical therapy program. This may be done by having a user active system wherein the user must feed in information to the computer each time an exercise or a therapy session occurs, or the system itself may be interlinked with actual exercise equipment such as treadmills, exercise bicycles, rowing machines, weight pulls, etc. and direct information from the exercise equipment will be communicated to the computer and subsequently to the monitor to assure compliance by the patient.

In any of the above embodiments, the present invention in its more refined embodiment may include computer recognition and feedback of actual times and dates for every required dosage (specific day and/or time of day) and for every actual dosage removed from the medicine container. In other words, the system will provide the patient and/or professional with output showing actual versus required usage on a time based dosage for dosage comparison. When this mode is utilized the computer will be provided with necessary information to generate requirements and the patient will weigh the medicine container at each use of the medicine container.

Obviously, numerous modifications and variations of the present invention are possible in light of the above teachings. It is therefore understood that within the scope of the appended claims, the invention may be practised otherwise than as specifically described herein.

What is claimed is:

1. A method of monitoring a patient's medicine compliance, which comprises:
    (a) weighing a container of medicine to determine a starting weight on a scale which is connected to a computer with a display unit;
    (b) storing the starting weight in said computer;
    (c) reweighing the container of medicine after a prescribed dosage is consumed to determine a second weight;
    (d) having said computer determine the difference between said starting weight and said second weight to store a dosage unit weight;
    (e) having the computer programmed to calculate compliance required weights of the container for each dosage administration for the prescription period of the medicine;
    (f) reweighing the container of medicine from time to time on said scale to compare actual weight with compliance required weight to determine compliance; and
    (g) visually displaying the compliance results on said display unit to permit compliance monitoring.

2. The method of claim 1 wherein said computer is further programmed to compare actual weight of the container of medicine with the required compliance weight to provide corrective instructions to the patient on said display unit.

3. The method of claim 1 wherein said computer is programmed to and does display a dosage schedule on said display unit as a function of time.

4. The method of claim 1 wherein said computer is programmed to receive specific day and/or time of day information for providing the patient with compliance information.

5. The method of claim 2 wherein said computer is programmed to receive specific day and/or time of day information for providing the patient with compliance information.

6. The method of claim 1 wherein said method includes remote communication to a professional for compliance monitoring.

7. The method of claim 6 wherein said display unit is a unit located with the patient and a second display unit is located remotely with said professional.

8. The method of claim 6 wherein said professional has a computer/display unit and has the capability of screening different patients as desired.

9. The method of claim 8 wherein said computer/display unit of said professional is programmed to and connected to a patient's display unit to permit the professional to give instructions to said patient.

10. The method of claim 1 wherein said reweighing of the container from time to time involves reweighing the container after each dosage administration.

11. The method of claim 2 wherein said reweighing of the container from time to time involves reweighing the container after each dosage administration.

12. The method of claim 6 wherein said reweighing of the container from time to time involves reweighing the container after each dosage administration.

13. The method of claim 1 wherein the method is repeated for a plurality of different containers of medicine and the computer determines and stores compliance information for each of said plurality of different containers of medicine.

14. The method of claim 1 wherein said method further includes monitoring one or more of a patient's medical characteristics to provide supplemental patient information to the computer.

15. The method of claim 14 wherein said one or more patient medical characteristics is one or more vital signs.

16. The method of claim 15 wherein said medical characteristics are selected from one or more of heart rate, blood pressure, glucose, cholesterol, blood cell count, respiration or body weight.

17. The method of claim 14 wherein said patient medical characteristics include detailed physical regimen results taken from patient exerciser therapy equipment.

18. A system for patient medicine compliance and patient status monitoring, which comprises:
   (a) a scale for weighing one or more containers of medicine and having sufficient accuracy to measure weight to establish changes by dosage consumption.
   (b) a computer connected to said scale which is capable of receiving a first weight of a container of medicine, a second weight thereof after first dosage consumption, determining the difference between the two weights to establish a dosage unit weight, and storing same, and further capable of calculating container of medicine required compliance weight for each dosage to be taken over the period of prescription, and further capable of displaying compliance information upon a display unit; and
   (c) a display unit connected to said computer.

19. The system of claim 18 wherein said scale, computer and display unit are located at a single site to permit patient self-monitoring.

20. The system of claim 18 wherein said computer is further capable of performing for a plurality of containers of medicine.

21. The system of claim 18 wherein said display unit is remotely located away from said patient for compliance monitoring by a professional.

22. The system of claim 18 wherein said computer is programmed to display a dosage schedule on said display unit.

23. The system of claim 18 wherein the computer is programmed to receive specific day and/or time of day information for providing the patient with compliance information.

24. The system of claim 21 wherein said professional has a computer/display unit and has the capability of screening different patients as desired.

25. The system of claim 21 wherein said computer/display unit of said professional is programmed to and connected to a patient's display unit to permit the professional to give instructions to said patient.

26. The system of claim 18 which further comprises means for monitoring patient medical characteristics which comprises a conversion device which converts medical testing or monitoring equipment signals to computer signals and means for transmitting converted signals to the computer.

* * * * *